US012653080B1

(12) United States Patent
Bourassa et al.

(10) Patent No.: US 12,653,080 B1
(45) Date of Patent: Jun. 16, 2026

(54) ROBUST COLLAPSIBLE SHOVEL

(71) Applicants: Dale Gerard Bourassa, Rancho Cordova, CA (US); Francis L. Wegener, Newcastle, CA (US)

(72) Inventors: Dale Gerard Bourassa, Rancho Cordova, CA (US); Francis L. Wegener, Newcastle, CA (US)

( * ) Notice: Subject to any disclaimer, the term of this patent is extended or adjusted under 35 U.S.C. 154(b) by 973 days.

(21) Appl. No.: 17/890,481

(22) Filed: Aug. 18, 2022

Related U.S. Application Data

(60) Provisional application No. 63/234,351, filed on Aug. 18, 2021.

(51) Int. Cl.
$$\begin{array}{ll} \textbf{\textit{B25G 1/06}} & (2006.01) \\ \textbf{\textit{A01B 1/02}} & (2006.01) \end{array}$$

(52) U.S. Cl.
CPC ............... A01B 1/022 (2013.01); B25G 1/06 (2013.01)

(58) Field of Classification Search
CPC ........... A01B 1/02; A01B 1/022; A01B 1/026; A01B 1/20; A01B 1/22; B25G 1/00; B25G 1/04; B25G 1/043; B25G 1/06; B25G 1/063
USPC ....................................... 294/49, 54.5, 57, 58
See application file for complete search history.

(56) References Cited

U.S. PATENT DOCUMENTS

| | | | | | |
|---|---|---|---|---|---|
| 1,380,090 | A | * | 5/1921 | Williams ................. | B25G 1/04 |
| | | | | | 81/489 |
| 2,789,839 | A | * | 4/1957 | Siebert .................... | A47L 13/24 |
| | | | | | 15/145 |
| 4,406,559 | A | * | 9/1983 | Geertsema ............... | B25G 3/18 |
| | | | | | 403/287 |
| 5,975,602 | A | * | 11/1999 | Zan ........................ | B25G 1/102 |
| | | | | | 294/58 |
| 6,669,397 | B1 | * | 12/2003 | Christion ................. | B25G 3/26 |
| | | | | | 403/322.2 |
| 6,925,686 | B2 | * | 8/2005 | Heathcock ............... | B25G 1/04 |
| | | | | | 16/427 |
| 8,347,546 | B2 | * | 1/2013 | Rupp .................... | A01K 87/025 |
| | | | | | 43/18.1 CT |
| 8,746,767 | B2 | * | 6/2014 | Mouch ..................... | B25G 3/12 |
| | | | | | 294/51 |
| 9,878,438 | B2 | * | 1/2018 | Mackin ..................... | B25G 3/12 |
| 10,822,757 | B2 | * | 11/2020 | Pavey ..................... | E01H 5/061 |
| 11,318,334 | B2 | * | 5/2022 | Haggett ................... | A62C 8/04 |
| 11,788,566 | B2 | * | 10/2023 | Willis ..................... | B25G 1/04 |
| | | | | | 403/296 |
| 12,052,937 | B2 | * | 8/2024 | Dittman ................... | A01B 1/22 |
| 12,240,033 | B2 | * | 3/2025 | Leber ..................... | B25G 3/36 |
| 12,460,666 | B2 | * | 11/2025 | Willis ..................... | F16B 7/182 |

(Continued)

*Primary Examiner* — Joshua E Rodden

(74) *Attorney, Agent, or Firm* — Heisler & Associates

(57) ABSTRACT

A first elongated shaft and a second elongated shaft are removably coupled together at a connector to facilitate collapsing of a handle of the shovel. A spade is attached to a distal end of the first shaft. The connector has two parts, with one of the two parts attached to each of the ends of the shaft that are adjacent to each other. One of the two parts of the connector includes an insert and the other of the two parts includes the receiver, with the insert fitting into the receiver in a removable but secure fashion. The shafts are formed of a robust durable material such as fiber reinforced polymer formed from a pultrusion method. A grip is optionally provided on a proximal end of the second shaft.

17 Claims, 4 Drawing Sheets

(56) References Cited

U.S. PATENT DOCUMENTS

| | | | | |
|---|---|---|---|---|
| 2003/0180085 | A1* | 9/2003 | Hughes | B25G 3/30 |
| | | | | 56/400.05 |
| 2003/0184104 | A1* | 10/2003 | Ping | A01B 1/227 |
| | | | | 294/57 |
| 2003/0233718 | A1* | 12/2003 | Heathcock | B25G 3/16 |
| | | | | 15/144.4 |
| 2014/0137338 | A1* | 5/2014 | Meinzer | B25H 3/02 |
| | | | | 81/488 |
| 2017/0014986 | A1* | 1/2017 | Chou | A01B 1/16 |
| 2017/0057074 | A1* | 3/2017 | D'Avignon | A01B 1/02 |
| 2020/0078924 | A1* | 3/2020 | Cavaliere | B25G 1/04 |
| 2020/0391371 | A1* | 12/2020 | Nelson | A01B 1/227 |
| 2022/0040840 | A1* | 2/2022 | Clark | B25G 3/30 |
| 2022/0151125 | A1* | 5/2022 | Dittman | A01B 1/22 |

* cited by examiner

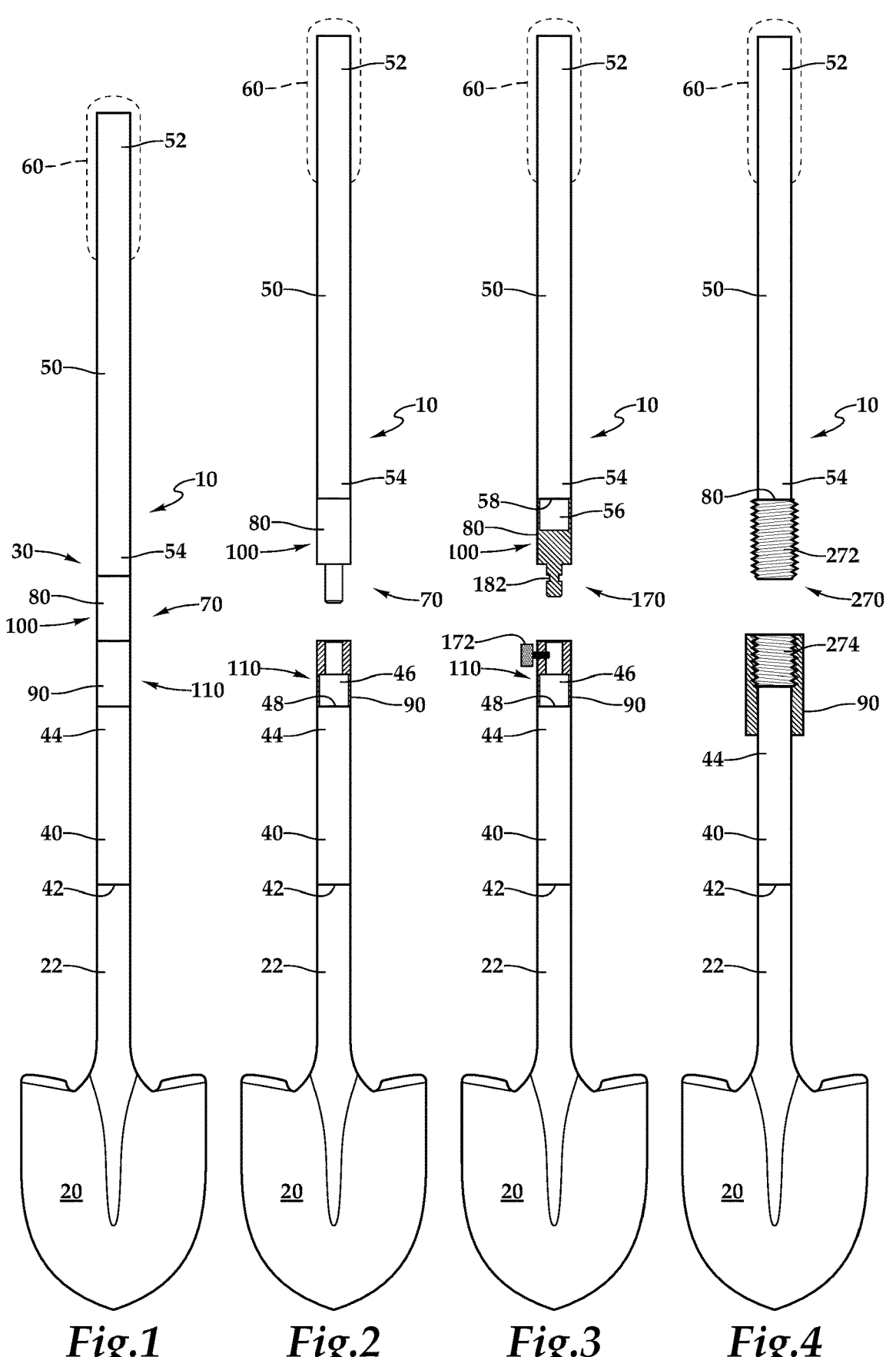
*Fig.1*     *Fig.2*     *Fig.3*     *Fig.4*

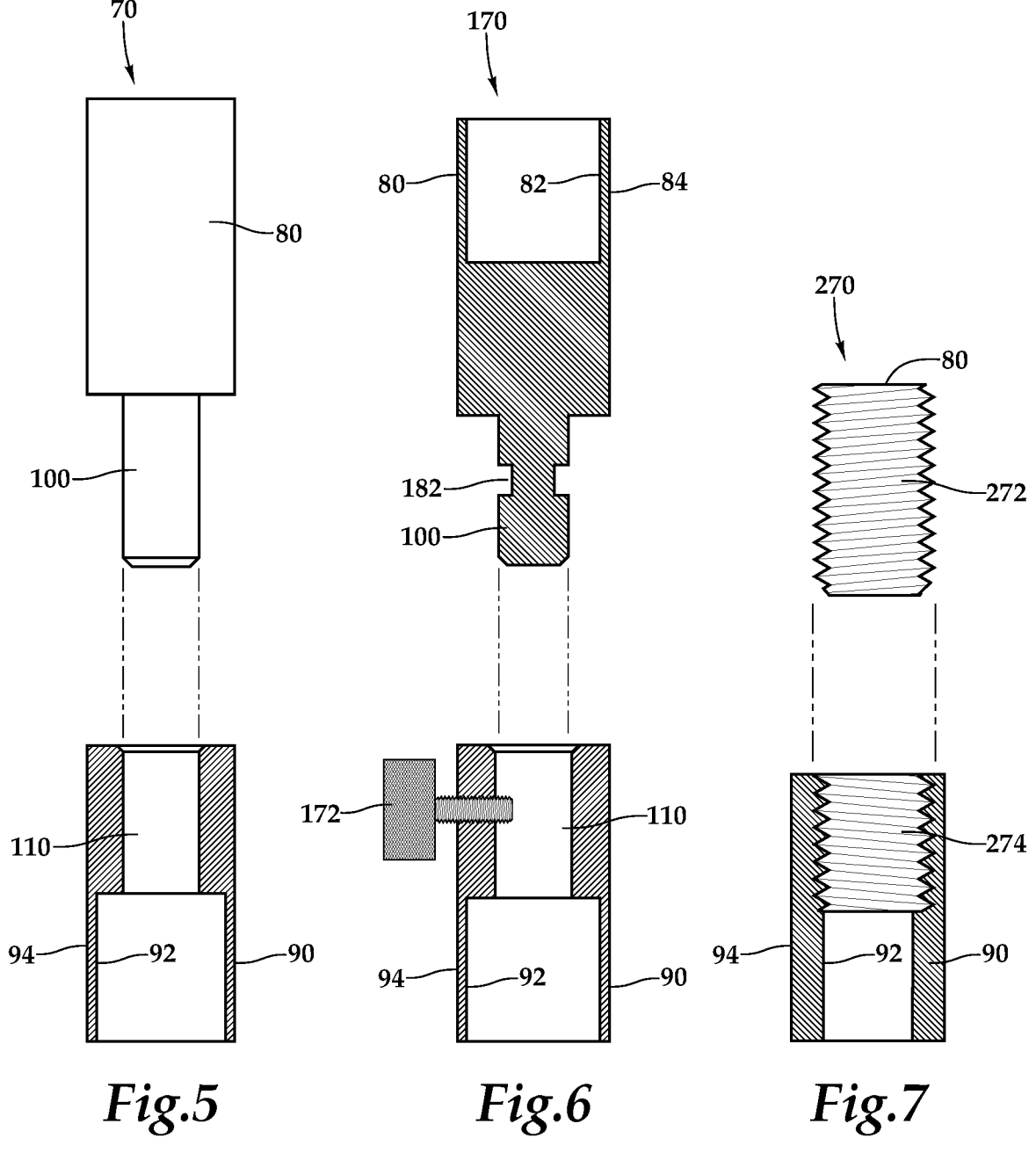
*Fig.5*        *Fig.6*        *Fig.7*

ROBUST COLLAPSIBLE SHOVEL

CROSS-REFERENCE TO RELATED APPLICATIONS

This application claims benefit under Title 35. United States Code § 119(e) of U.S. Provisional Application No. 63/234,351 filed on Aug. 18, 2021.

FIELD OF THE INVENTION

The following invention relates to shovels for use in digging the ground. More particularly, this invention relates to shovels which are collapsible into at least two separate parts.

BACKGROUND OF THE INVENTION

Shovels have been known since antiquity, generally including an elongated shaft, typically with a diameter of about two inches or less, so that it can be easily gripped by hands of a user, and with a distal end including a digging implement. This digging implement, often referred to as a spade, is typically formed of steel or other hard material and has a sharp tip to assist in ground penetration. The shape of the spade and its width, and any curvature are modified for different spades, depending on the particular purposes to which the shovel is intended.

Standard shovels have a shaft typically about six feet long, and often formed of wood. Such a shaft configuration, while simple and generally effective, has numerous drawbacks. First, the length of the shaft can make it difficult to store the shovel in many compact environments and to use the shovel in many compact environments. It is known to provide a shortened shaft/handle on a shovel so that the shovel can be used and stored in compact environments. However, when the handle is so short, it is more difficult for a user to dig in the ground while remaining upright standing on the ground. Rather, it becomes more necessary for the user to kneel down so the user can manipulate the handle while the spade is engaging the ground when the handle is so shortened.

Wooden shafts while easy to manufacture and relatively low cost, have limited strength characteristics and undergo weathering type degradation, so that such wooden handles typically have a limited lifespan. Painting or otherwise coating the handle can extend this lifespan somewhat, but can potentially require reapplication of paint/coatings periodically to maintain protection from shaft degradation. Often, when the handle becomes broken or damaged to the point where it is becoming less effective, the handle can be removed from the spade and replaced. However, this can be a complex procedure and often it is difficult to achieve a tight fit between a replacement handle and an old spade. Typically a new shovel is instead acquired, and remaining life in the spade portion of the shovel is wasted.

It is known to form shovels with shafts formed of a variety of other materials. These other materials can include metal or fiberglass. Such non-wooden shafts typically have a greater cost than wooden handles/shafts and still are susceptible to bending or breakage, or other damage, so that the investment in the more expensive handle can still be jeopardized. Accordingly, a need exists for stronger and more robust shovel shafts, so that when the greater investment is made, the shaft a sufficiently robust that a long useful life is provided, generally at least as long as an expected useful life of the spade, and generally spanning decades, provided a tip of the spade is periodically sharpened.

When a shovel having a robust shaft has a standard length such as about six feet, and it is desired to have that shaft be collapsible into separate parts, a significant challenge is presented in providing an adjustable mechanism which can be similarly suitably robust. Otherwise, any collapsibility facilitating joints can introduce points of potential failure which can jeopardize the goals of providing such a robust shovel, including long life and reliable service, and undermining the greater financial investments which are made in such a high quality tool.

SUMMARY OF THE INVENTION

With this invention, a robust collapsible shovel is provided which collapses into two parts so that it has a standard length (about six feet long) when in a deployed form, and which has a length of about half of this amount when collapsed into two parts, suitable for easily fitting within vehicle trunks, into (or upon) backpacks, and into equipment storage bins of a stationary and mobile variety. According to one embodiment, the shovel has two shafts including a first shaft defining a bottom of the shaft of the shovel and a second shaft defining a top of the shaft of the shovel. The first shaft has a distal end with a spade attached thereto and a proximal end opposite the distal end. The spade can be attached to the distal end of the first shaft with a rivet or utilizing an adhesive, or by other fasteners such as those which are known in the shovel arts. The proximal end of the first shaft has a portion of a connector thereon, as described in detail below.

The second shaft preferably generally has a length similar to that of the first shaft, but which can be slightly longer, and the second shaft can have a length similar to a combination of a length of the first shaft and a length of the spade. For instance, if the spade is six inches long, the second shaft might have a length of three feet and the first shaft might have a length of 2'6". The second shaft and first shaft preferably have a similar diameter, such as a 1.25 inch diameter shaft in one embodiment. The proximal end of the second shaft can have a handle grip thereon, such as formed of rubber, and provide a high friction surface texture to assist in handling the shovel. The distal end of the second shaft is fitted with a portion of the connector thereon, such connector described in detail below.

The first and second shafts of the shovel are preferably formed of a similar material, which is most preferably a non-wooden material. In a preferred embodiment, the shafts are formed of fiber reinforced polymer, such as that which can be formed using various different techniques, but which are most preferably formed from a pultrusion method, such as that provided by Liberty Pultrusion of Pittsburgh, Pennsylvania. The shafts can be either solid or have a hollow core, or a core which is filled with some material distinct from the material from which an outer portion of the shafts are formed. Most preferably, the shafts are solid fiberglass reinforced aromatic polyurethane. Formed of such a material, the shafts are corrosion resistant, non-conductive electrically, low-conductive thermally, non-magnetic and exhibiting electromagnetic transparency, lightweight, high strength, having dimensional stability (especially in different thermal environments), and being generally low maintenance.

At least the proximal end of the first shaft and the distal end of the second shaft are preferably sized to have a slightly lesser diameter to facilitate attachment to a portion of the connector. In particular, in one embodiment the shafts step down from having a 1.25 inch diameter to having a 1.09 inch diameter. An abrupt step preferably defines a transition between the lesser diameter portion of the shafts and the main portion of the shafts, which lesser diameter portions are preferably about 1.5 inches long along a central axis of each shaft. This step and smaller diameter portion can be provided through a post manufacturing milling operation, or can be formed during initial manufacture of the shaft through a molding process. Preferably, a surface of this lesser diameter portion of the shaft is somewhat roughened so that it is highly capable of engaging with adhesive to hold portions of a connector thereto.

A connector is provided which has two parts. These two parts are configured so that they can be removably attachable relative to each other. Each of the two parts includes a sleeve on one portion thereof opposite an engagement portion, which engagement portions of the two parts engage together for removable attachability. In a typical embodiment, these engagement portions include an insert and a receiver, the insert generally sized to fit within the receiver. The insert and the receiver are both preferably radially symmetrical and aligned with a central axis of the connector which is also aligned centrally with the sleeves of each part of the connector.

The sleeves are configured to fit over the reduced diameter portions of the proximal end of the first shaft and the distal end of the second shaft. Thus, these sleeves have an inner diameter which is preferably about 1.09 inches in diameter plus a tolerance amount. The length of the sleeves is preferably approximately 1.5 inches, or other length to correspond with the reduced diameter portion of the proximal end of the first shaft and the distal end of the second shaft. In alternative embodiments, the reduced diameter portions of the shafts could be eliminated, and the sleeves could merely have an inner diameter matching the outer diameter of the first shaft and the second shaft (plus a tolerance amount).

Most preferably, the tolerance amount between the sleeve and the reduced diameter portion of the shaft is 30 mils ($\frac{3}{64}$ inch) so that an annular space between an inner wall of the sleeve and an outer wall of the reduced diameter portion of the shaft has a width of 15 mils ($\frac{3}{128}$ inch). In one embodiment, an adhesive for holding parts of the connector to the proximal end of the first shaft and the distal end of the second shaft are in the form of an epoxy which includes beads therein (such as glass beads or other beads of high hardness). These beads are 10 mils ($\frac{1}{64}$ inch) in diameter. In this way, the beads within the adhesive cause the sleeve to be close to perfectly axially aligned with the shaft to which the sleeve is connected, the beads keeping the sleeve so that the gap inboard of the sleeve is never less than 10 mils. It is thus assured that a relatively uniform layer of epoxy is provided between the sleeve and the reduced diameter portions of the shafts.

An inner surface of the sleeves of the parts of the connector can also be appropriately etched (or roughened or otherwise prepared) so that the epoxy or other adhesive provides an exceptionally strong bond between the shafts and the sleeves of the parts of the connector. This connection between the shafts and parts of the connector can be mimicked at a junction between the spade and the first shaft if desired, and potentially with modifications thereto to accommodate the different material on the spade side of this adhesive joint.

The engagement portions of the two parts of the connector, typically in the form of the insert and the receiver, can in one embodiment merely be a cylindrical insert sized to fit within a cylindrical receiver. The insert can be sufficiently long so that when it is placed within the receiver, little to no wobble is accommodated therebetween. The insert can have an outer surface layer formed of rubber and the size of the insert and the receiver can be configured with a tight tolerance or even a friction fit, so that secure but removable attachment is provided between the insert and the receiver. In particular, linear forces cause the insert to be forced into the receiver and for a tight joint therebetween. However, axial tension forces between the first shaft and second shaft can cause the insert to be removed from the receiver. Because shovels are not typically used in tension (or with only low tension loads), such a connection can be effective.

In a second embodiment, the receiver can be modified to include a setscrew rotatable along a line perpendicular to a central axis of the receiver, so the setscrew can be tightened or loosened to enhance forces holding the insert within the receiver. As a further alternative, the insert can be modified to include a recess, a blind bore or a through bore into which the setscrew can travel somewhat for secure attachment of the insert within the receiver.

In a third embodiment, the insert and the receiver are both threaded in form, such as with the insert having male threads thereon and the receiver having female threads thereon which male and female threads are complementary with each other. In such an embodiment, the second shaft and first shaft would be rotated relative to each other with the parts of the connectors adjacent to each other, to cause the male insert to be threaded into the female receiver. Similarly, such threads can be configured with tight tolerance or even a friction fit, and appropriate materials, such as rubber or high strength polymer, so that the shafts resist rotation relative to each other, unless sufficiently large rotational forces are applied to cause rotation and separation of the shafts from each other.

OBJECTS OF THE INVENTION

Accordingly, a primary object of the present invention is to provide a shovel with an elongated handle that can be collapsed into at least two separate parts.

Another object of the present invention is to provide a shovel with an elongated handle with a first shaft portion and a second shaft portion which are removably attachable together, and which shovel can be used either with both shaft portions attached together or only with the first shaft portion and a spade at an end of the first shaft portion.

Another object of the present invention is to provide a collapsible shovel which includes connectors for collapsing a shaft of the shovel into at least two parts, and which connector is high strength to resist failure at this connection point.

Another object of the present invention is to provide a collapsible shovel which includes a connector for collapsing the shovel into at least two parts, and which connector is tight fitting to minimize or eliminate bending of the elongated shaft at this connection point provided by the connector.

Another object of the present invention is to provide a collapsible shaft which is made of a material that is high strength, durable and corrosion resistant.

Another object to the present invention is to provide a method for digging with a shovel which includes adjusting a length of a shaft of the shovel to provide an optimized shaft length for the digging operation.

Another object of the present invention is to provide a method for transporting a shovel which includes collapsing an elongated handle of the shovel into at least two parts of a lesser length than the handle for transport, and then later restoring the elongated handle to full length after transport.

Other further objects of the present invention will become apparent from a careful reading of the included drawing figures, the claims and detailed description of the invention.

BRIEF DESCRIPTION OF THE DRAWINGS

FIG. 1 is a plan view of the shovel of this invention according to one embodiment with the handle comprised of two separate shafts removably attachable together at a connector therebetween, and with the two separate shafts shown joined together.

FIG. 2 is a plan view of that which is shown in FIG. 1, but with the two separate shafts shown separated from each other at the connector and illustrating a first embodiment for an insert and receiver of the connector.

FIG. 3 is a plan view similar to that which is shown in FIG. 2, but for a second embodiment of the connector insert and receiver.

FIG. 4 is a plan view similar to that which is shown in FIG. 2, but for a third embodiment of the connector insert and receiver.

FIG. 5 is a plan view of the connector of the first embodiment of FIG. 2.

FIG. 6 is a plan view of the connector of the second embodiment of FIG. 3.

FIG. 7 is a plan view of the connector of the third embodiment of FIG. 4.

DESCRIPTION OF THE PREFERRED EMBODIMENT

Figures 8, 9, 10, 11, 12:
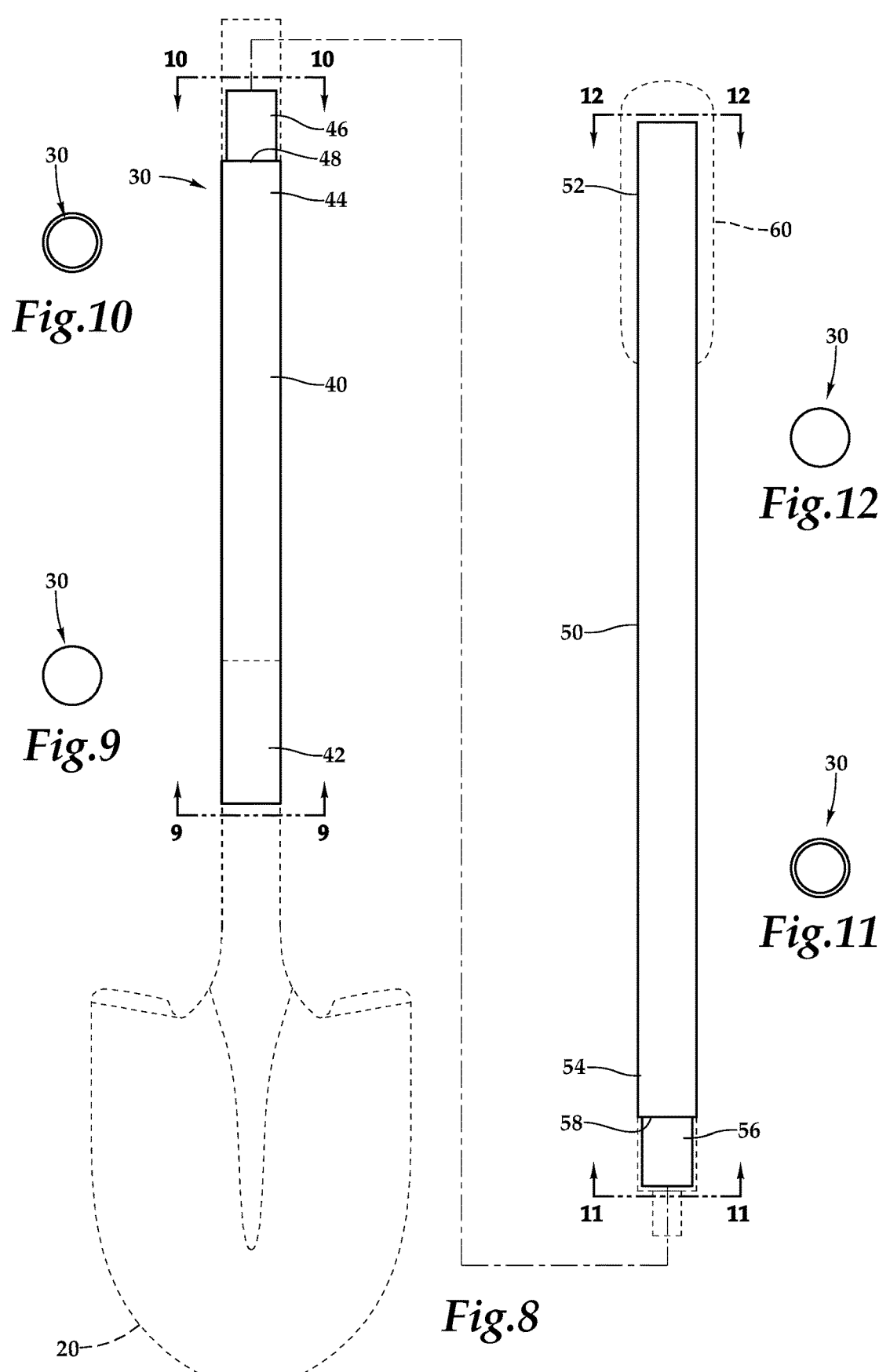
FIG. 8 is a top plan view of the handle of the shovel of this invention according to one embodiment, and with the spade, connector and grip shown in broken lines to illustrate how the spade, connector and grip could vary or be omitted in different embodiments which could utilize the same two part handle. A bottom plan view, front view and rear view being the same as this top plan view.
FIG. 9 is a distal end view of a first shaft of the handle which is shown in FIG. 8.
FIG. 10 is a proximal end view of the first shaft of the handle which is shown in FIG. 8.
FIG. 11 is a distal end view of a second shaft of the handle which is shown in FIG. 8.
FIG. 12 is a proximal end view of the second shaft of the handle which is shown in FIG. 8.

Referring to the drawings, wherein like reference numerals represent like parts throughout the various drawing figures, reference numeral 10 is directed to a shovel (FIGS. 1 and 2) provided according to one embodiment of this invention. The shovel 10 has a handle 30 which is collapsible into at least two parts to facilitate more convenient storage and/or transportation, and also to facilitate use of the shovel with a shortened handle as one option.

In essence, and with particular reference to FIGS. 1 and 2, basic details of the invention are described according to one example embodiment. The shovel 10 includes a spade 20 adapted to effectively cut into dirt or other material to be shoveled, as well as an elongated handle 30 extending along a linear central axis away from the spade 20. The handle 30 is separated into a first shaft 40 and a second shaft 50. The spade 20 attaches to a distal end 42 of the first shaft 40. An optional grip 60 can be provided on a proximal end 52 of the second shaft 50. The shafts 40, 50 are removably attachable together at a connector 70. The connector 70 includes two parts removably attachable together, and with one of the parts attached to the first shaft 40 and the other of the two parts attached to the second shaft 50. Each part of the connector 70 includes a first sleeve 80 or second sleeve 90 which are bonded or otherwise attached to a proximal end 44 of the first shaft 40 or a distal end 54 of the second shaft 50. Each part of the connector 70 also includes either an insert 100 or a receiver 110. The insert 100 and receiver 110 are configured to be securely but removably attached to each other to facilitate connection of the first shaft 40 to the second shaft 50 through the connector 70. Details of the insert 100 and receiver 110 can be provided according to alternative embodiment connectors 70, 170, 270.

More specifically, and with particular reference to FIGS. 1 and 2, details of the spade 20 and handle 30 are described, according to this one example embodiment. The spade 20 can be any of a variety of different configurations provided for spades and similar portions of various different types of shovels. For instance, if snow is to be shoveled, the spade 20 can be provided in a form and size optimized for shoveling snow. Similarly, other optimized spades 20 can be provided. The spade 20 depicted in FIGS. 1 and 2 is a general purpose soil digging spade 20. Proportions of this spade 20 relative to proportions of the handle 30 merely illustrate one option, with these proportions corresponding to a handle having a 1.25 inch diameter or a 1.5 inch diameter.

In one embodiment, the spade 20 is attached to a distal end 42 of the first shaft 40 through a rivet passing through a neck 22 of the spade 20 and through an appropriately located bore passing through the first shaft 40 near the distal end 42 of the first shaft 40 and with this through bore extending perpendicular to a central axis of the handle 30. As an alternative to such a rivet, a bolt and nut could be utilized. Similarly, other fasteners could be utilized through such corresponding holes in the neck 22 of the spade 20 and the distal end 42 of the first shaft 40.

As an alternative, the neck 22 of the spade 20 could be attached to the distal end 42 of the first shaft 40 utilizing an adhesive, and as one option, following details described below for how the sleeves 80, 90 of the parts of the connector 70 attach to the first shaft 40 and second shaft 50. As a further alternative, the neck 22 of the spade 20 could attach to a distal end of a third shaft through a connector similar to the connector 70 described in detail below. In such a three shaft alternative, each of the three shafts could be appropriately sized so that they are similar in length when the length of the spade 20 is added to a length of such an optional third shaft. For instance, a six foot shovel could have two shafts of about two feet in length and such a third shaft plus spade length would combine for two feet of length.

In one embodiment, a kit including multiple different types of spades 20 can be provided and with appropriate portions of a connector associated with these multiple different types of spades 20 so that they can be removably attached and be interchangeable with each other for placement upon the first shaft 40. In this way, the kit can allow the shovel 10 to be operated digging in different materials and have an optimized form. Such an arrangement also facilitates a manufacturer accessorizing the shovel 10 with optional different spades 20 which a consumer can acquire (or not) depending on the needs of the consumer. Furthermore, if one spade 20 is damaged or lost, a new spade 20 can be acquired so that the handle 30 can continue to be used.

The handle 30 extends linearly away from the spade 20 and provides a structure which can be gripped by hands of a user when utilizing the shovel 10. A diameter of the handle 30 can be selected to optimize use, with typical examples being a 1.25 inch outer diameter or a 1.5 inch outer diameter. Typically the handle 30 has a circular cross-section so that the handle 30 is an elongated cylinder in form. This overall shape of the handle 30 is interrupted by at least one connector 70 dividing to handle 30 into the first shaft 40 and second shaft 50 as described in detail below. Conceivably, the handle 30 could be provided as at least one option without any connector 70 therein, but only with a connector adjacent to the spade 20. A manufacturer could then provide as one optional accessory within a kit, an elongated non-collapsible handle (but the shovel 10 would still be somewhat collapsible by removal of the spade 20), should such a single piece handle be desired by a sufficiently large number of consumers to warrant its manufacture.

Regardless of the number of shafts 40, 50 from which the handle 30 is formed, the handle 30 is generally formed with different portions that are made of a similar material. This material is in one embodiment a fiber reinforced polymer. Different manufacturing techniques can be utilized to form the handle 30. In one embodiment, a pultrusion method is utilized. In one embodiment, this pultrusion method can be substantially continuous and then sections of an initially manufactured elongate article can be cut to desired lengths to make up the various different shafts 40, 50 (or single piece handle). Further manufacture of parts of the handle 30 can then occur such as through utilizing a drill to form holes at appropriate locations such as for attachment of the spade 20, or for certain embodiments of the connector 70. Machining can also occur at ends of handle 30 portions which are to be fitted with sleeves 80, 90 of connectors 70 according to various embodiments. Such a machining operation could be performed on a lathe, end mill, specialty grinder, or other machinery. Other materials and manufacturing techniques could be utilized in alternative embodiments which could still incorporate many features according to various different embodiments of this invention.

Figures 13, 14, 15, 16, 17:
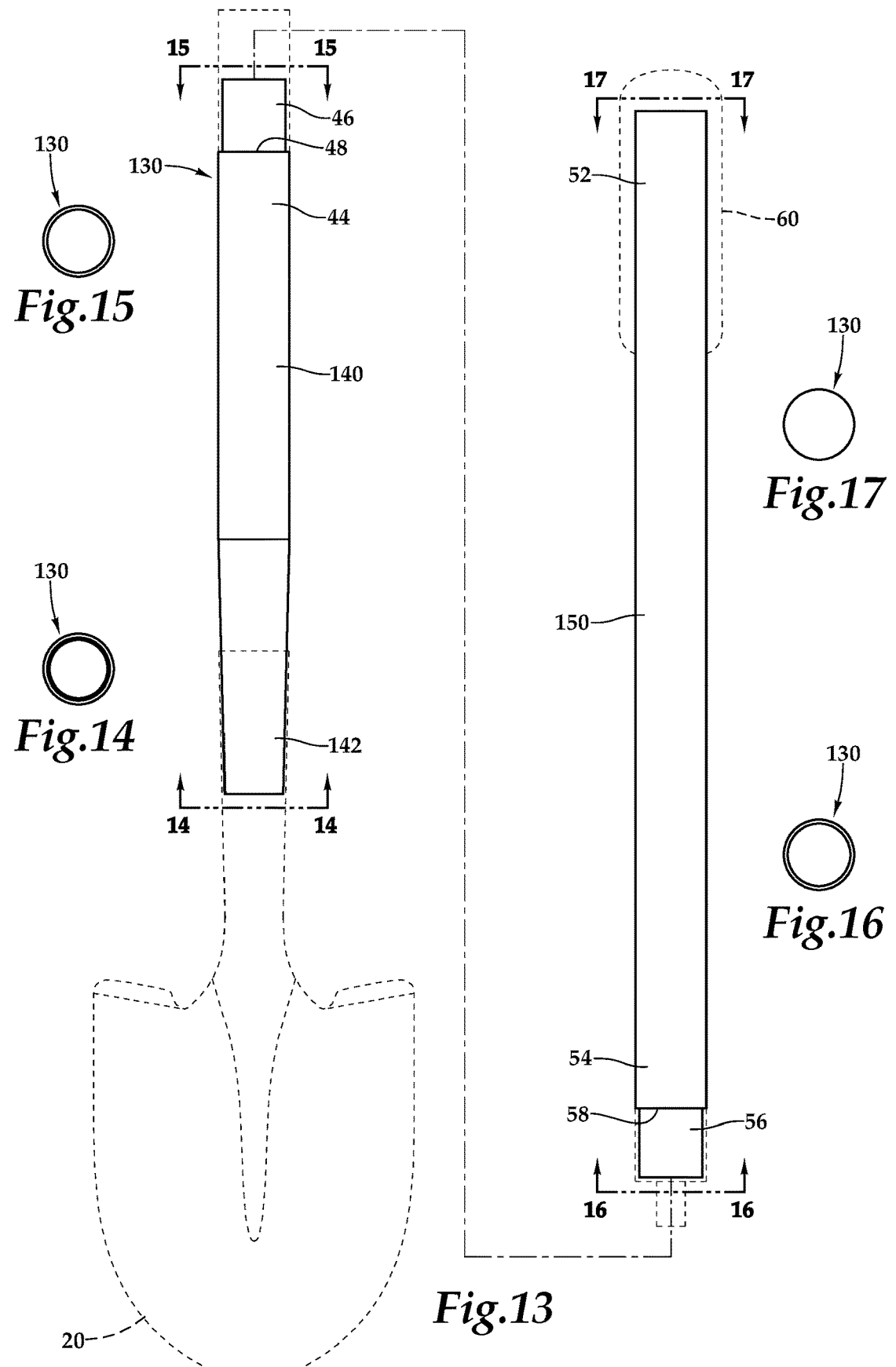
FIG. 13 is a top plan view of the handle of the shovel of this invention according to a further embodiment, and with the spade, connector and grip shown in broken lines to illustrate how the spade, connector and grip could vary or be omitted in different embodiments which could utilize the same two part handle. A bottom plan view, front view and rear view being the same has this top plan view.
FIG. 14 is a distal end view of a first shaft of the handle which is shown in FIG. 13.
FIG. 15 is a proximal end view of the first shaft of the handle which is shown in FIG. 13.
FIG. 16 is a distal end view of a second shaft of the handle which is shown in FIG. 13.
FIG. 17 is a proximal end view of the second shaft of the handle which is shown in FIG. 13.

With continuing reference to FIGS. 1 and 2, details of the first shaft 40 and second shaft 50 are described, according to an example embodiment. The first shaft 40 defines a bottom half of the handle 30 which attaches to the spade 20 through the distal end 42 of the first shaft 40. This distal end 42 can be appropriately modified to facilitate attachment of the spade 20, as described above. In one optional embodiment (FIG. 13) the first shaft 40 is a tapered first shaft 140 which exhibits a taper in diameter from a larger diameter at a proximal end 44 to a lesser diameter at the tapered distal end 142. For instance, the proximal end could have a diameter of 1.5 inches and the tapered distal end 142 could have a diameter of 1.25 inches. Such an exterior form could be provided either through manufacture by molding, machining, or appropriate modification of the pultrusion process to allow for a tapering extra diameter, through some post pultrusion machining process, or through some other technique.

The proximal end 44 of the first shaft 40 is prepared in one embodiment to receive one part of the connector 70 affixed thereto. In one embodiment, no such preparation is required, and the first sleeve 80 is sized with an inner wall 82 generally matching an exterior diameter of the proximal end 44 of the first shaft 40. In such an embodiment, the part of the connector 70 attached to the proximal end 44 of the first shaft 40 would extend radially to a greater diameter than 1.5 inches, leaving the connector 70 defining a larger diameter mid-portion of the handle 30. In the embodiment shown in FIGS. 1 and 2, the proximal end 44 is prepared, such as through machining, to provide a step 46 between a transition 48 and a tip of the proximal end 44. The transition 48 is preferably abrupt and oriented substantially within a plane perpendicular to a central axis of the first shaft 40 which is preferably collinear with the central axis of the handle 30.

This step 46 defines a cylindrical portion of the proximal end 44 which has a lesser external diameter than other portions of the first shaft 40. For instance, if the diameter of the first shaft 40 is 1.25 inches, the step 46 can have a diameter of 1.09 inches. Careful sizing of the step 46 along with the part of the connector 70 attaching to the step 46 at the proximal end 45 the first shaft 40 through the first sleeve 80 of this part of the connector 70, allows for secure attachment thereto.

In particular, this attachment is preferably achieved through bonding. Such bonding is preferably with an adhesive such as an epoxy. Such bonding could alternatively involve some form of welding or friction fitting together. Details of this bonding are described in detail below. In one embodiment, the step 46 has its surface prepared to best perform in such a bonding process. For instance, the surface can be roughened and/or etched or otherwise prepared so that a stronger bond can be provided between the proximal end 44 and the first sleeve 80 on the part of the connector 70 affixed to the proximal end 44.

The second shaft 50 is in this embodiment similar to the first shaft 40. A proximal end 52 can be fitted with a grip 60 such as a thin walled rubber sleeve closed on a tip to cover a butt of the handle 30. This grip 60 could be formed by dipping into a molten material, such as a rubber or plastic, or could be pre-manufactured and slid onto the proximal end 52 of the second shaft 50. As an alternative, no grip 60 could be provided. As an option, the proximal end 52 could be machined to cause the proximal end 52 to be more rounded, such as with a generally hemispherical form.

The second shaft has a distal end 54 thereof prepared to have a second sleeve 90 on a second part of the connector 70 attached thereto. Such a preparation of the distal end 54 is similar to the preparation of the proximal end 44 of the first shaft 40 described in detail above. In particular, a step 56 is provided between a transition 58 and a tip of the distal end 54. This step 56 could be eliminated if the connector 70 is oversized as described as an option above (see FIG. 4). Such a preparation of a step 56 is preferably identical to preparation of the step 46 associated with the first shaft 40. Typically the length of the second shaft 50 is slightly greater than the length of the first shaft 40, so that the second shaft 50 is approximately as long as a combination of lengths of the first shaft 40 and the spade 20 attached to the distal end 42 of the first shaft 40.

With particular reference to FIGS. 5-7, details of the connector 70 are described. FIGS. 2 and 5 show a first embodiment connector 70 of this invention, with FIGS. 3 and 6 showing a second embodiment connector 170 and with FIGS. 4 and 7 showing a third embodiment connector 270. The connector 70, 170, 270 includes two parts which join together in a removable fashion to cause the first shaft 40 to be removably attachable to the second shaft 50 and to facilitate collapsing of the shovel 10 of this invention.

The two parts of the connector 70, 170, 270 are preferably interchangeable with each other, so that either one of the two parts could be attached to the first shaft 40 at the proximal end 44 thereof and either of the two parts could be attached to the second shaft 50 at the distal end 54 thereof. These two parts are not identical, but rather are complementary to provide for a firm but removable attachment through the connector 70. Each of these parts includes a first sleeve 80 or second sleeve 90 thereon which can attach to either the first step 46 at the proximal end 44 of the first shaft 40 or to the step 56 of the proximal end 52 of the second shaft 50. Each of these parts also includes an engagement portion opposite the sleeve 80, 90, with the engagement portion either being an insert 100 or a receiver 110.

The sleeves 80, 90 are cylindrical structures with a hollow interior defined by an inner wall 82, 92 and with a thickness of the sleeve 80, 90 defined by a spacing between this inner wall 82, 92 and an outer wall 84, 94. The inner wall 82, 92 and the outer wall 84, 94 are preferably concentric with each other to cause the wall to have a constant thickness. An adhesive 86 fills a space between the inner wall 82, 92 of the sleeve 80, 90 and the step 46, 56. Most preferably tight tolerance is maintained between the inner wall 82, 92 and the step 46, 56 and with carefully controlled dimensions for a secure and robust bond between the steps 46, 56 and the sleeves 80, 90. For instance, tolerance spacing between these surfaces can be maintained at 15 mils. Adhesive can be an epoxy including glass beads therein which glass beads are 10 mils in diameter. These glass beads keep the spacing from shifting appreciably between opposing sides of this space around the step 46, 56. By roughening or etching the steps 46, 56 (and optionally also the inner wall 82, 92 of the sleeve 80, 90) the adhesive can penetrate somewhat into these surfaces to further provide an exceptionally strong bond therebetween.

In the first embodiment of FIGS. 2 and 5, the insert 100 and receiver 110 are not further modified but rather are merely a correspondingly sized cylinder for the insert 100 and cylindrical hole for the receiver 110. To provide a tight fit therebetween, either a very small tolerance spacing or no tolerance spacing, or even a friction fit with a negative tolerance spacing, can be utilized. Furthermore, materials from which the insert 100 and receiver 110 are provided can be selected so that some degree of compression/expansion thereof can occur so that even if a friction fit is provided with a negative tolerance spacing, the insert 100 and/or receiver 110 can have surfaces thereof deflect sufficiently to still allow the insert 100 to be fit into the receiver 110. Options for materials of the insert 100 and/or receiver 110 could include rubbers of various different hardnesses and resiliencies. As an option, the insert 100 could taper slightly so that it is actually slightly frustoconical and the receiver 110 would typically have a corresponding shape. Such a "draft" between insert 100 and receiver 110 would typically either be nonexistent or exceptionally small to further ensure secure connection therebetween.

With particular reference to FIGS. 3 and 6, details of the connector 170 are described according to an alternative embodiment. In this embodiment, the insert 100 and receiver 110 are slightly modified. In particular, a setscrew 172 is provided passing through a wall of the receiver 110. A recess 182, or optionally a blind bore or through bore, is provided extending into the insert 100 along a line aligned with the setscrew 172, so that the setscrew 172 can extend somewhat into this recess 182. The setscrew 172 includes a handle 174 which can be gripped by a user and rotated. The setscrew 172 resides within a threaded hole passing through the wall of the receiver 110 and the setscrew 172 has corresponding threads, so the rotation of the setscrew 172 causes it to advance (or retreat) for attachment (or detachment) of the parts of the connector 70 together.

Which particular reference to FIGS. 3 and 7, details of a third embodiment connector 270 are described. In this embodiment, the insert 110 is provided with male threads 272 thereon and the receiver 110 is provided with female threads 274 thereon. In this embodiment, the first shaft 40 and second shaft 50 are rotated relative to each other about the central axis thereof, causing the male threads 272 to engage with the female threads 274 and to secure the shafts 40, 50 together about this connector 270. The threads 272, 274 can be formed a resilient material and with tight tolerances as options to provide for secure attachment. In other embodiments, the threads 272, 274 can be differential in nature so that they get tighter and tighter as they rotate together.

As a further option, a hybrid of the connector 70 and the connector 270 can be provided. In such a hybrid, the insert 100 has male threads thereon, akin to the threads 272 of the connector 270. Also, the receiver 110 includes female threads therein akin to the threads 274 of the connector 270. In such a hybrid embodiment, the receiver 110 is preferably deeper than a length of the insert 100, so that threading together of the two parts of the hybrid connector continues until the flat faces surrounding the insert 100 and the receiver 110 butt up against each other. Friction on these faces can also tend to amplify secure holding of the handle 30 first shaft 40 and second shaft 50 together with little or no "play" therebetween. This friction can be increased further, if desired, by use of a resilient coating or resilient (e.g. rubber) grommet where these faces come together.

FIGS. 8-17 merely illustrate with use of broken lines how the handle 30 provides a common form which can work with different spades 20, connectors 70, 170, 270 and optional grip 60 so that the design for the handle 30 can be common across these different embodiments. In FIGS. 13-17 a tapering first shaft portion 140 of the handle 130 is tapering in form and connects to a second shaft 150 without taper, as one design option.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A robust collapsible shovel, comprising in combination:

a first shaft having a spade on a distal end thereof and a proximal end opposite said distal end;

a second shaft having a proximal end opposite a distal end;

a connector having two parts including a first part and a second part, said two parts removably attachable to each other along a central axis of said connector;

said first part of said connector coupled to said proximal end of said first shaft;

said second part of said connector coupled to said distal end of said second shaft;

wherein said connector is coupled to said first shaft and said second shaft through an adhesive; and wherein said proximal end of said first shaft includes a lesser diameter tip of cylindrical form, and with said first part of said connector including a sleeve thereon, said sleeve having an inner diameter similar to an outer diameter of said tip at said proximal end of said first shaft, plus a tolerance amount, said tip having a lesser diameter than portions of said first shaft more spaced from said proximal end then said tip.

2. The shovel of claim 1 wherein said central axis of said connector is aligned and co-linear with a central axis of said first shaft and said second shaft.

3. The shovel of claim 1 wherein said adhesive includes beads thereon.

4. The shovel of claim 3 wherein said beads are sized greater than 50% of a size of a tolerance space between said tip and said sleeve.

5. The shovel of claim 4 wherein said beads are formed of glass.

6. The shovel of claim 1 wherein said two parts of said connector include an insert and a receiver, said insert sized complementary with said receiver so that said insert can fit within said receiver.

7. The shovel of claim 6 wherein said insert and said receiver exhibit a friction fit therebetween.

8. The shovel of claim 7 wherein at least one of said insert and said receiver includes a rubber surface.

9. The shovel of claim 6 wherein said receiver includes a set screw rotatable to pass through a wall of said receiver to engage said insert and hold said insert within said receiver.

10. The shovel of claim 9 wherein said insert includes an indentation therein, sized to receive said setscrew therein.

11. The shovel of claim 9 wherein said insert includes a through bore therein, sized to receive said setscrew therein.

12. The shovel of claim 6 wherein said insert and said receiver are each threaded with complementary male and female threads for threadable attachment of said two parts of said connector together.

13. The shovel of claim 1 wherein said second shaft includes a handle grip on said proximal end.

14. The shovel of claim 13 wherein said handle grip is formed of rubber.

15. The shovel of claim 1 wherein said first shaft and said second shaft are each formed of a non-electrically conductive material.

16. The shovel of claim 15 wherein said first shaft and said second shaft are each formed of fiber reinforced polymer.

17. The shovel of claim 16 wherein said first shaft and said second shaft are each formed by pultrusion.

* * * * *